US010786952B2

(12) United States Patent
Bech

(10) Patent No.: US 10,786,952 B2
(45) Date of Patent: Sep. 29, 2020

(54) MANUFACTURE OF WIND TURBINE BLADES

(71) Applicant: Vestas Wind Systems A/S, Aarhus N. (DK)

(72) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/777,271

(22) PCT Filed: Nov. 23, 2016

(86) PCT No.: PCT/DK2016/050388
§ 371 (c)(1),
(2) Date: May 18, 2018

(87) PCT Pub. No.: WO2017/088885
PCT Pub. Date: Jun. 1, 2017

(65) Prior Publication Data
US 2018/0345603 A1 Dec. 6, 2018

(30) Foreign Application Priority Data
Nov. 26, 2015 (DK) .................................. 2015 70763

(51) Int. Cl.
*B29C 70/34* (2006.01)
*B29D 99/00* (2010.01)
(Continued)

(52) U.S. Cl.
CPC ........ *B29C 70/342* (2013.01); *B29D 99/0028* (2013.01); *F03D 1/0675* (2013.01);
(Continued)

(58) Field of Classification Search
CPC ..................... B29D 99/0025; B29D 99/0028
(Continued)

(56) References Cited

U.S. PATENT DOCUMENTS 5,707,723 A * 1/1998 Harrison ............... B29C 70/086
428/313.3
2009/0229748 A1 9/2009 Berchtold et al.
(Continued)

FOREIGN PATENT DOCUMENTS

CN 104114856 A 10/2014
DE 102010002782 A1 9/2011
(Continued)

OTHER PUBLICATIONS

Danish Patent and Trademark Office, Search and Examination Report in PA 2015 70763, dated May 24, 2016.
(Continued)

*Primary Examiner* — Sing P Chan
(74) *Attorney, Agent, or Firm* — Wood Herron & Evans LLP

(57) ABSTRACT

A method of making a wind turbine blade is described. The blade comprises an outer shell having a laminate structure. The method comprises providing a blade mould (82) defining a shape of at least part of the outer shell of the blade. The mould extends in a spanwise direction between a root end (94) and a tip end (96), and extends in a chordwise direction between a leading edge (90) and a trailing edge (92). The method further includes providing a plurality of dry plies (66) comprising dry structural fibrous material and a plurality of prepreg (68) plies comprising structural fibrous material impregnated with resin. The plurality of dry plies and the plurality of prepreg plies are arranged in the mould to form a plurality of layers of the laminate structure of the outer shell of the blade. The plies are arranged in the mould such that the dry plies are interleaved with the prepreg plies to form a hybrid shell structure in which the plies are arranged in a staggered relationship such that corresponding edges of the dry plies are offset from one another in the spanwise and/or chordwise direction of the mould and/or
(Continued)

corresponding edges of the prepreg plies are offset from one another in the spanwise and/or chordwise direction of the mould.

12 Claims, 13 Drawing Sheets

(51) Int. Cl.
    *F03D 1/06*     (2006.01)
    *B29L 31/08*     (2006.01)

(52) U.S. Cl.
    CPC ..... *B29L 2031/085* (2013.01); *F05B 2240/21* (2013.01); *F05B 2240/30* (2013.01); *F05B 2280/6003* (2013.01); *F05B 2280/6013* (2013.01); *F05B 2280/6014* (2013.01); *F05B 2280/6015* (2013.01); *Y02E 10/72* (2013.01); *Y02P 70/50* (2015.11)

(58) Field of Classification Search
    USPC .......................................................... 156/242
    See application file for complete search history.

(56) References Cited

U.S. PATENT DOCUMENTS

2010/0084079 A1*   4/2010   Hayden ................. B29C 70/222
                                                                             156/189
2014/0301859 A1* 10/2014   Hancock ............... F03D 1/0675
                                                                             416/230

FOREIGN PATENT DOCUMENTS

| JP | H07156172 A | 6/1995 |
|---|---|---|
| WO | 2010083840 A2 | 7/2010 |
| WO | 10097657 A1 | 9/2010 |
| WO | 2014094787 A1 | 6/2014 |
| WO | 2014131770 A1 | 9/2014 |

OTHER PUBLICATIONS

European Patent Office, International Search Report and Written Opinion in PCT Application No. PCT/DK2016/050388, dated Feb. 7, 2017.

China National Intellectual Property Administration, First Notification of Office Action in CN Application No. 201680079053.4, dated Sep. 19, 2019.

\* cited by examiner

MANUFACTURE OF WIND TURBINE BLADES

TECHNICAL FIELD

The present invention relates to the manufacture of wind turbine blades.

BACKGROUND

Modern wind turbine blades typically comprise a blade shell having a laminate structure of composite construction. The shell is commonly manufactured using a vacuum-assisted resin infusion process. The process generally involves arranging dry fibrous reinforcing material in a blade mould to form a layup.

The dry fibrous material forming the layup typically comprises glass and/or carbon fibres. The material may be provided as a woven or non-woven fabric and/or in the form of bundles of fibres or loose fibres. The layup typically comprises a plurality of layers of material arranged in the mould. The layers are stacked on top of one another according to the required thickness and structure of the shell. As the blade mould generally includes regions of high curvature, the layers are sometimes connected together, for example by stitching. This prevents the layers from sliding relative to one another in the mould.

Once the layup has been assembled in the mould, it is then covered with a vacuum film, which is sealed against flanges of the mould to form a sealed region encapsulating the layup. Air is withdrawn from the sealed region to form an effective vacuum. Resin is then admitted into the evacuated sealed region. The resin infuses throughout the dry fibrous material. Finally, heat is applied to cure the resin.

Whilst the above process provides good results, it is relatively time-consuming since dry fabric can be difficult to position accurately in the mould and is prone to creasing and wrinkling. Typically layers of dry fabric are stitched together offline in order to fix their relative positions, but this adds complexity and additional time to the process. Careful control over the composition and quantity of the resin administered during the infusion process is also required and it is critical to ensure that no leaks develop in the vacuum film during the process, which could compromise the infusion process.

It is also known to use prepreg materials instead of dry fabric for wind turbine blade manufacture. Prepreg material includes fibrous reinforcing material that is pre-impregnated with resin. The use of prepreg materials avoids the need for supplying resin to the layup. However, prepreg materials are significantly more expensive than dry materials and are more difficult to handle in view of the impregnated resin. The use of prepreg material also introduces complications when creating thick structures where several stacked layers of prepreg material may be required to build up the required thickness of the structure. This is because the resin contained in the layers inhibits air extraction through the stacked layers during the vacuum process. Accordingly, it is generally required to perform a series of de-bulking processes on the stacked prepreg layers as they are arranged in the mould to remove trapped air. The de-bulking process adds time and complexity to the blade manufacturing process.

Against this background, the present invention aims to provide a method of manufacturing a wind turbine blade that presents one or more advantages over the current methods detailed above. The invention also aims to provide a wind turbine blade having a novel and improved shell structure.

SUMMARY OF THE INVENTION

According to an aspect of the present invention, there is provided a method of making a wind turbine blade comprising an outer shell having a laminate structure, the method comprising: providing a blade mould defining a shape of at least part of the outer shell of the blade, the mould extending in a spanwise direction between a root end and a tip end, and extending in a chordwise direction between a leading edge and a trailing edge; providing a plurality of dry plies comprising dry structural fibrous material; providing a plurality of prepreg plies comprising structural fibrous material impregnated with resin; arranging the plurality of dry plies and the plurality of prepreg plies in the mould to form a plurality of layers of the laminate structure of the outer shell of the blade, wherein the plies are arranged in the mould such that the dry plies are interleaved with the prepreg plies to form a hybrid shell structure in which the plies are arranged in a staggered relationship such that corresponding edges of the dry plies are offset from one another in the spanwise and/or chordwise direction of the mould and/or corresponding edges of the prepreg plies are offset from one another in the spanwise and/or chordwise direction of the mould.

Corresponding edges of dry plies may be offset from corresponding edges of prepreg plies. Corresponding edges of plies may be offset in both spanwise and chordwise directions.

The method may comprise arranging one or more preforms in the mould to form the hybrid shell structure. Each preform may comprise at least one dry ply of the plurality of dry plies adhered to at least one prepreg ply of the plurality of prepreg plies.

Successive plies and/or preforms in the hybrid structure may have dissimilar dimensions in the chordwise and/or spanwise directions. For example, the method may comprise forming the hybrid structure by successively arranging a series of plies or preforms of progressively decreasing width and/or length.

The method may comprise forming the hybrid shell structure from the plurality of dry plies and the plurality of prepreg plies outside the mould. The method may comprise lifting the hybrid shell structure, once formed, into the mould.

The method may comprise forming the hybrid shell structure in one or more discrete regions of the mould. The discrete regions of the mould may correspond to regions of the outer shell where increased thickness is required.

The method may comprise forming the hybrid shell structure specifically at the root end of the mould and/or at the tip end of the mould and/or adjacent the leading edge of the mould and/or adjacent the trailing edge of the mould.

The method may comprise arranging or forming an elongate reinforcing member in the mould. One or both ends of the reinforcing structure may be arranged on top of or between one or more plies of the hybrid shell structure. The elongate reinforcing member may be a spar or a stringer or a component part thereof, for example a spar cap or part of a stringer.

The method may comprise arranging the hybrid shell structure to form a continuation of the reinforcing member at the root end and/or at the tip end of the mould.

A first end of the reinforcing member may be spaced from the root end of the mould. The hybrid shell structure may be arranged to extend in a spanwise direction between the root end of the mould and the first end of the reinforcing member.

The hybrid shell structure may taper in width in the chordwise direction moving from the root end of the mould towards the first end of the reinforcing member.

The method may comprise providing one or more root inserts at the root end of the mould. The root inserts may be provided on top of or between plies of the hybrid shell structure.

The hybrid shell structure may be arranged to form part of an inner and/or an outer skin of the outer shell of the blade.

The method may comprise providing an initial layer of prepreg material in the mould prior to arranging the hybrid shell structure on top.

The method may comprise causing resin from the prepreg plies to infuse into the dry plies. This may be achieved by increasing the temperature of the plies. The method may comprise curing the resin.

The method may comprise integrating the materials comprising the outer shell of the blade together. This may be achieved by means of the resin contained in the prepreg materials. The method may comprise integrating the materials without supplying additional resin from an external source.

According to another aspect of the invention there is provided a wind turbine blade manufactured according to the above method.

According to a further aspect of the invention there is provided a wind turbine comprising a wind turbine blade manufactured according to the above method.

BRIEF DESCRIPTION OF THE DRAWINGS

A non-limiting example of the invention will now be described in detail with reference to the following figures, in which:

FIG. 4b is a schematic plan view of a preform comprising the dry and prepreg plies of FIG. 4a;

FIG. 7b is a schematic chordwise cross-sectional view of the stack shown in FIG. 7a taken along the line 7b-7b in FIG. 7a;

FIG. 7c is a schematic chordwise cross-sectional view of the stack shown in FIG. 7a taken along the line 7c-7c in FIG. 7a;

FIG. 7d is a schematic spanwise cross-sectional view of the stack shown in FIG. 7a taken along the line 7d-7d in FIG. 7a;

FIG. 7e is a schematic spanwise cross-sectional view of the stack shown in FIG. 7a taken along the line 7e-7e in FIG. 7a;

DETAILED DESCRIPTION

Figure 1:
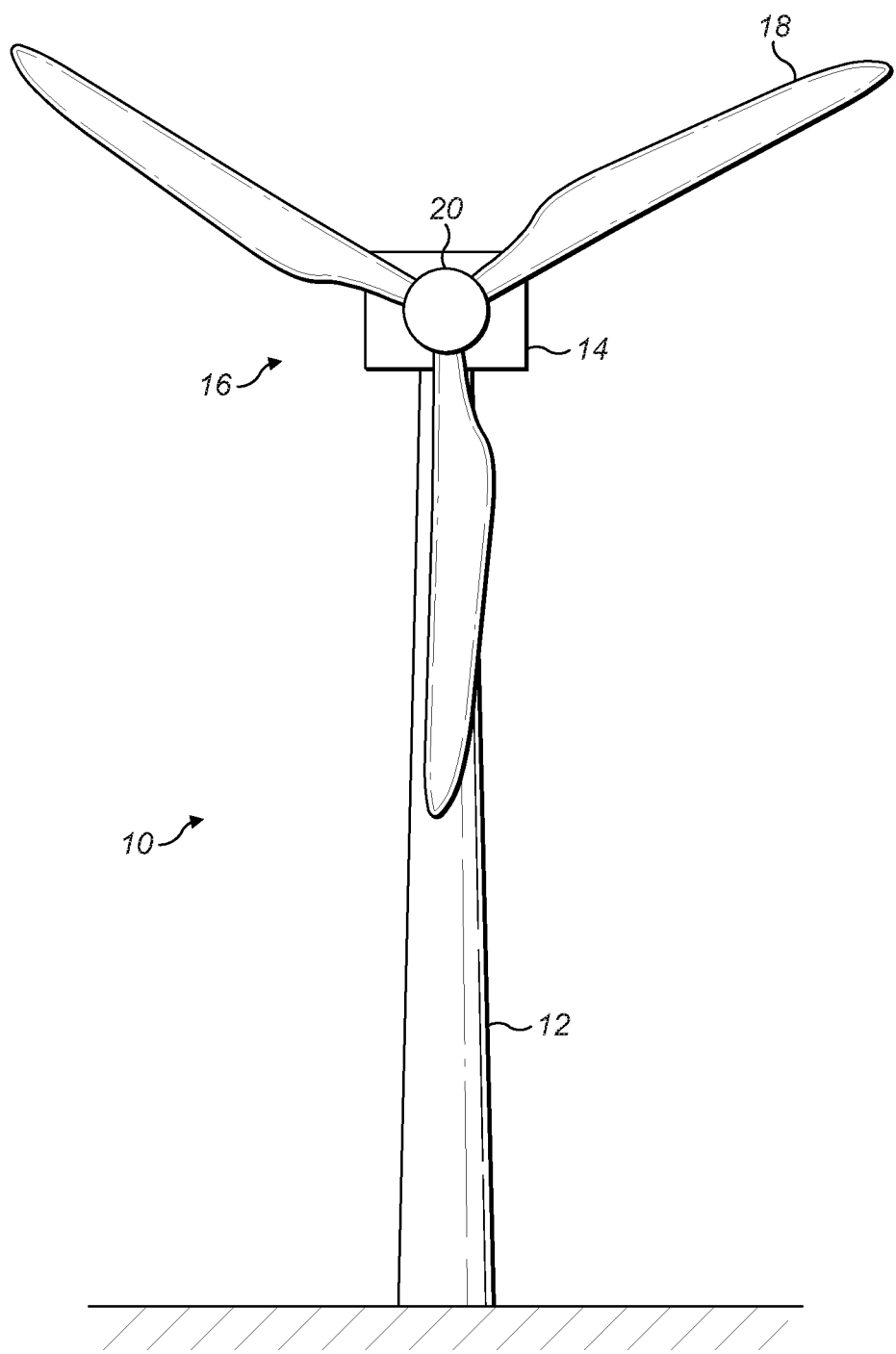
FIG. 1 shows a wind turbine.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18.

Figure 2:
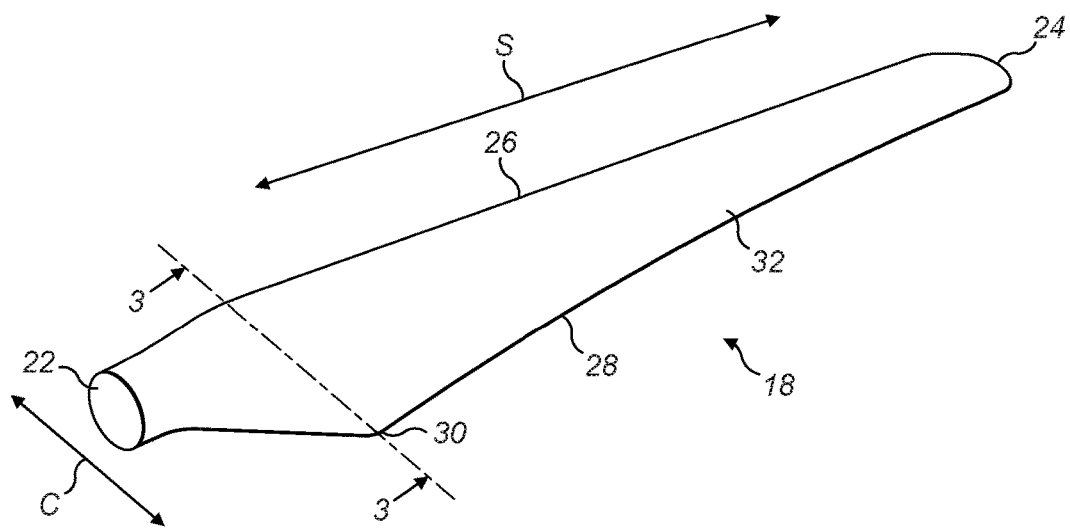
FIG. 2 is a perspective view of a blade of the wind turbine of FIG. 1.

FIG. 2 is a perspective view of one of the blades 18 of the wind turbine 10. The blade 18 extends from a generally circular root end 22 to a tip end 24 in a longitudinal 'spanwise' direction S, and between a leading edge 26 and a trailing edge 28 in a transverse 'chordwise' direction C. The blade transitions from a circular profile to an airfoil profile moving from the root end 22 of the blade 18 towards a shoulder 30 of the blade 18, which is the widest part of the blade 18 where the blade 18 has its maximum chord. The blade 18 has an airfoil profile of progressively decreasing thickness in an outboard portion 32 of the blade 18, which extends from the shoulder 30 to the tip 24 of the blade 18.

Figure 3:
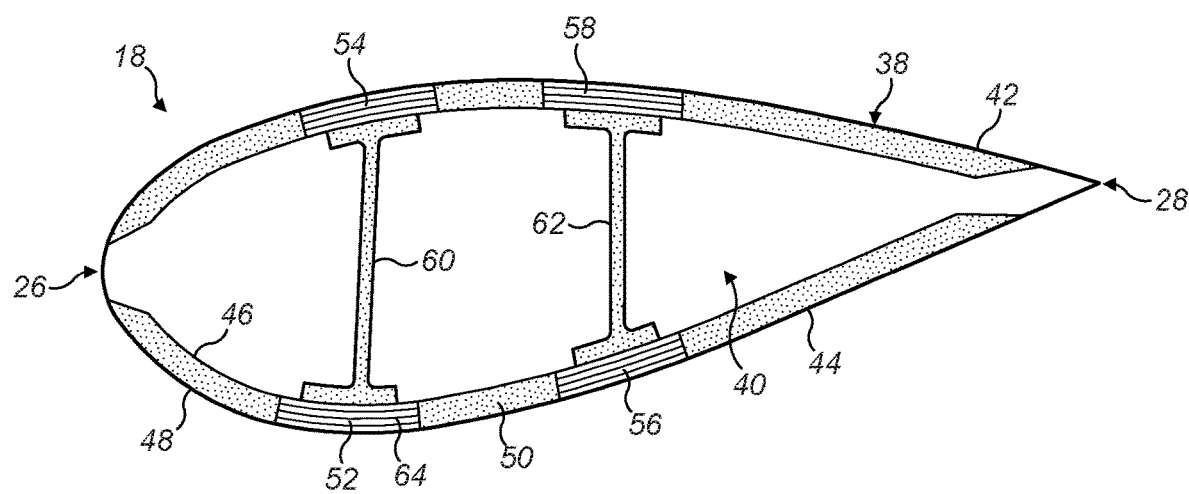
FIG. 3 is a schematic cross-sectional view of the wind turbine blade taken along the line 3-3 in FIG. 2.

FIG. 3 is a cross-section through the blade 18 taken along the line 3-3 in FIG. 2, i.e. through the shoulder 30 of the blade 18. Referring to FIG. 3, the blade 18 has an outer shell 38 defining a substantially hollow interior region 40 of the blade 18. The outer shell 38 is a laminate structure of composite construction and is fabricated from two half shells: a leeward shell 42 and a windward shell 44. The shells 42, 44 are moulded primarily from glass-fibre reinforced plastic (GRP).

The outer shell 38 comprises inner and outer skins 46, 48 made primarily from GRP. As will be described in further detail later, parts of the inner and outer skins 46, 48 of the blade 18 have a hybrid structure in that they are formed from alternating layers of dry glass-fibre fabric and prepreg glass-fibre fabric. In certain regions of the shell 38, a core 50 of lightweight foam (e.g. polyurethane) is provided between the skins 46, 48.

The outer shell 38 further includes first and second pairs of spar caps 52, 54, 56, 58 embedded within the laminate structure of the shell 38. One spar cap of each pair 52, 56 is integrated with the windward shell 44 and the other spar cap of each pair 54, 58 is integrated with the leeward shell 42. The spar caps 52, 54, 56, 58 of the respective pairs are mutually opposed and extend longitudinally along the length of the blade 18.

A first longitudinally-extending shear web 60 bridges the first pair of spar caps 52, 54 and a second longitudinally-extending shear web 62 bridges the second pair of spar caps 56, 58. The shear webs 60, 62 in combination with the spar caps 52, 54, 56, 58 form a pair of I-beam structures, which transfer loads from the rotating blade 18 to the hub 20 of the wind turbine 10 (see FIG. 1). The spar caps 52, 54, 56, 58 in particular transfer tensile and compressive bending loads, whilst the shear webs 60, 62 transfer shear stresses in the blade 18.

Each spar cap 52, 54, 56, 58 has a substantially rectangular cross section and is made up of a stack of pre-fabricated reinforcing strips 64. The strips 64 are pultruded strips of carbon-fibre reinforced plastic (CFRP), and are substantially flat and of rectangular cross section. The number of strips 64 in the stack depends upon the thickness of the strips 64 and the required thickness of the shell 38, but typically there may be between four and twelve strips 64 in the stack. The strips 64 have a high tensile strength, and hence have a high load bearing capacity.

The strips 64 are formed by pultrusion, a continuous process similar to extrusion, in which fibres are pulled through a supply of liquid resin and through dies that shape the strip 64. The resin is then cured, for example by heating in an open chamber, or by employing heated dies that cure the resin as the strip 64 is pultruded.

Whilst not shown in FIG. 3, the blade 18 may also include leading and trailing edge stringers in the form of strips of glass fibre or carbon fibre arranged adjacent parts of the leading and trailing edges 26, 28 of the blade 18 on either side of the foam core material 50. The stringers provide additional reinforcement at the leading and trailing edges 26, 28.

This so-called 'structural shell design' shown in FIG. 3, in which the spar caps 52, 54, 56, 58 are integrated within the structure of the outer shell 38, avoids the need for a separately formed spar such as a reinforcing beam, which is typically bonded to an inner surface of the shell 38 in many conventional wind turbine blades.

It has been mentioned above that parts of the blade shell 38 have a hybrid structure in that they are made up of a stack of alternating layers of dry and prepreg material. A method for manufacturing the blade 18 to produce the hybrid shell structure will be described in detail below with reference to FIGS. 5 to 12. However, in order to facilitate the discussion of the method, there first follows a brief discussion of the materials used to construct the hybrid structure.

Figure 4A:
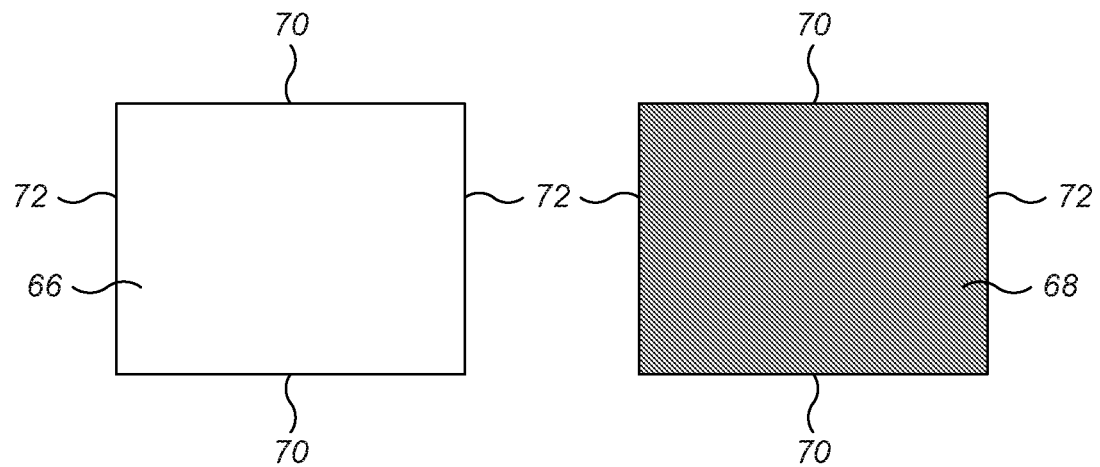
FIG. 4a are schematic plan views of a dry ply and a prepreg ply.

Referring therefore to FIG. 4a, this is a schematic plan view of a dry ply 66 and a prepreg ply 68, which are used to form laminate layers of the hybrid blade shell structure. The dry ply 66 comprises a layer of dry structural fibrous material. The dry structural fibrous material may comprise glass fibres, carbon fibres, aramid fibres or any other suitable structural fibres used in composite construction. In this particular example the dry ply is a stitched biax glass fabric. The prepreg ply 68 comprises structural fibrous material that is impregnated with resin. The structural fibrous material may comprise glass fibres, carbon fibres, aramid fibres or any other suitable structural fibrous material used in composite construction. The resin may comprise epoxy resin or any other suitable resin used in prepreg materials. However, in this particular example the prepreg ply is a stitched biax glass fabric pre-impregnated with epoxy resin.

The dry ply 66 and the prepreg ply 68 are both substantially rectangular in this example, and are of substantially the same length and width. In other examples, the plies 66, 68 could have a different shape and the prepreg ply 68 may not have the same dimensions as the dry ply 66. The plies 66, 68 each comprise first and second edges 70, 72, as indicated in FIG. 4a. In the subsequent discussion of the blade manufacturing process, the first edges 70 will be referred to as 'chordwise' edges, and the second edges 72 will be referred to as 'spanwise' edges, corresponding to the general orientation of these edges when the plies 66, 68 are arranged in a blade mould.

Figure 4B:
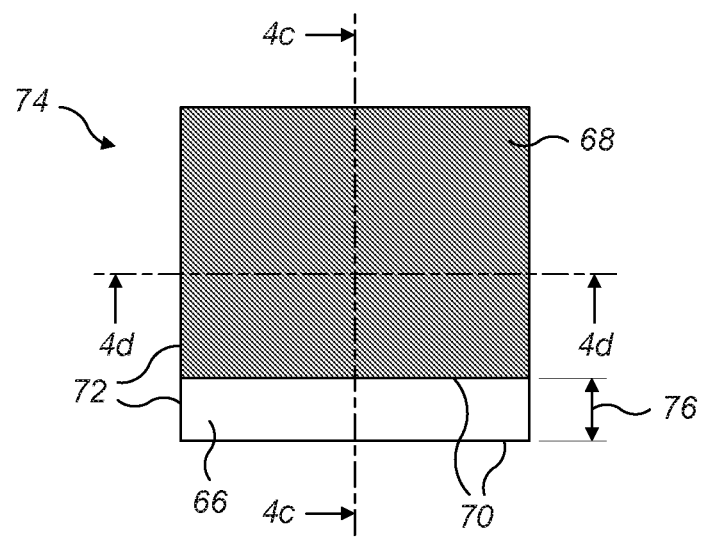

Referring now to FIG. 4b, this shows the prepreg ply 68 arranged on top of the dry ply 66 to form a preform 74. In this example, the dry and prepreg plies 66, 68 are arranged in a staggered relation such that the corresponding chordwise edges 70 of the plies 66, 68 are offset by a predetermined offset distance 76. The corresponding spanwise edges 72 of the dry and prepreg plies 66, 68 are substantially aligned in this example. However, in other examples these edges 72 may also be offset either instead of or in addition to the offset chordwise edges 70. In other embodiments, both the chordwise and spanwise edges 70, 72 of the respective plies 66, 68 may be substantially aligned such that the plies 66, 68 forming the preform 74 are not staggered.

Figure 4C:
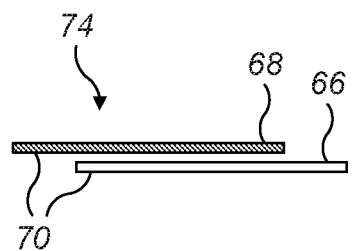
FIG. 4c is a schematic cross-sectional view of the preform taken along the line 4c-4c in FIG. 4b.
Figure 4D:
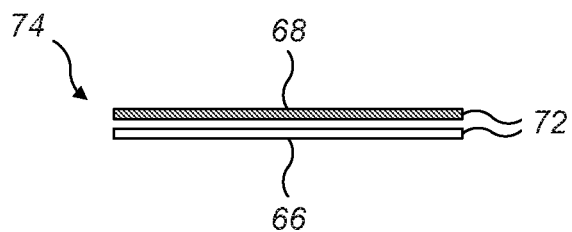
FIG. 4d is a schematic cross-sectional view of the preform taken along the line 4d-4d in FIG. 4b.

FIGS. 4c and 4d are schematic cross sections through the preform 74 taken along the lines 4c-4c and 4d-4d respectively in FIG. 4b. The dry ply 66 is indicated by the unfilled line, and the prepreg ply 68 is indicated by the filled line. FIG. 4c illustrates the staggered relationship between the plies 66, 68, and shows the offset between the corresponding chordwise edges 70 of the plies 66, 68, whereas FIG. 4d illustrates the alignment between the corresponding spanwise edges 72 of the plies 66, 68.

Figure 4E:
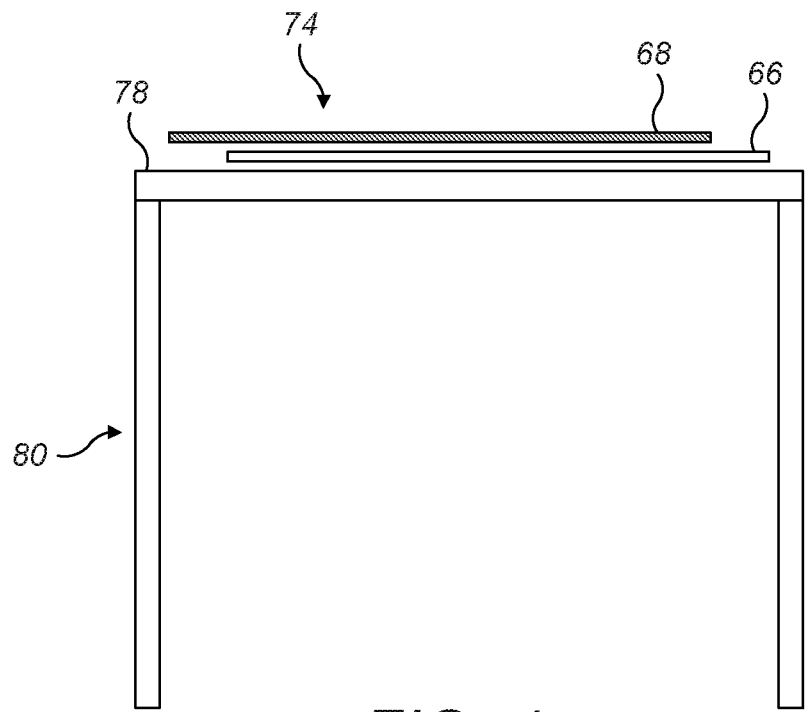
FIG. 4e shows the preform of FIGS. 4b-4d being prepared on a table.

Referring to FIG. 4e, the preform 74 is assembled by arranging the dry ply 66 on a flat surface 78, e.g. on a table 80 as shown in FIG. 4e. The dry ply 66 is smoothed out on the surface 78 of the table 80 to eliminate any wrinkles, and the prepreg ply 68 is placed on top of the dry ply 66 in staggered relation. The resin in the prepreg fabric 68 results in the prepreg being tacky. Accordingly, the dry fabric 66 sticks to the prepreg fabric 68 and the prepreg fabric 68 serves to maintain the shape of the dry fabric 66 keeping it free of wrinkles and creases.

The dry fabric 66 facilitates subsequent handling of the preform 74 since the operator may avoid touching the prepreg 68 when the preform 74 is subsequently placed in the mould. The tack of the prepreg 68 advantageously prevents any wrinkles or creases developing in the dry fabric 66 when the preform 74 is subsequently positioned in the mould.

The method of making the wind turbine blade 18 will now be described with reference to FIGS. 5 to 12.

Figure 5:
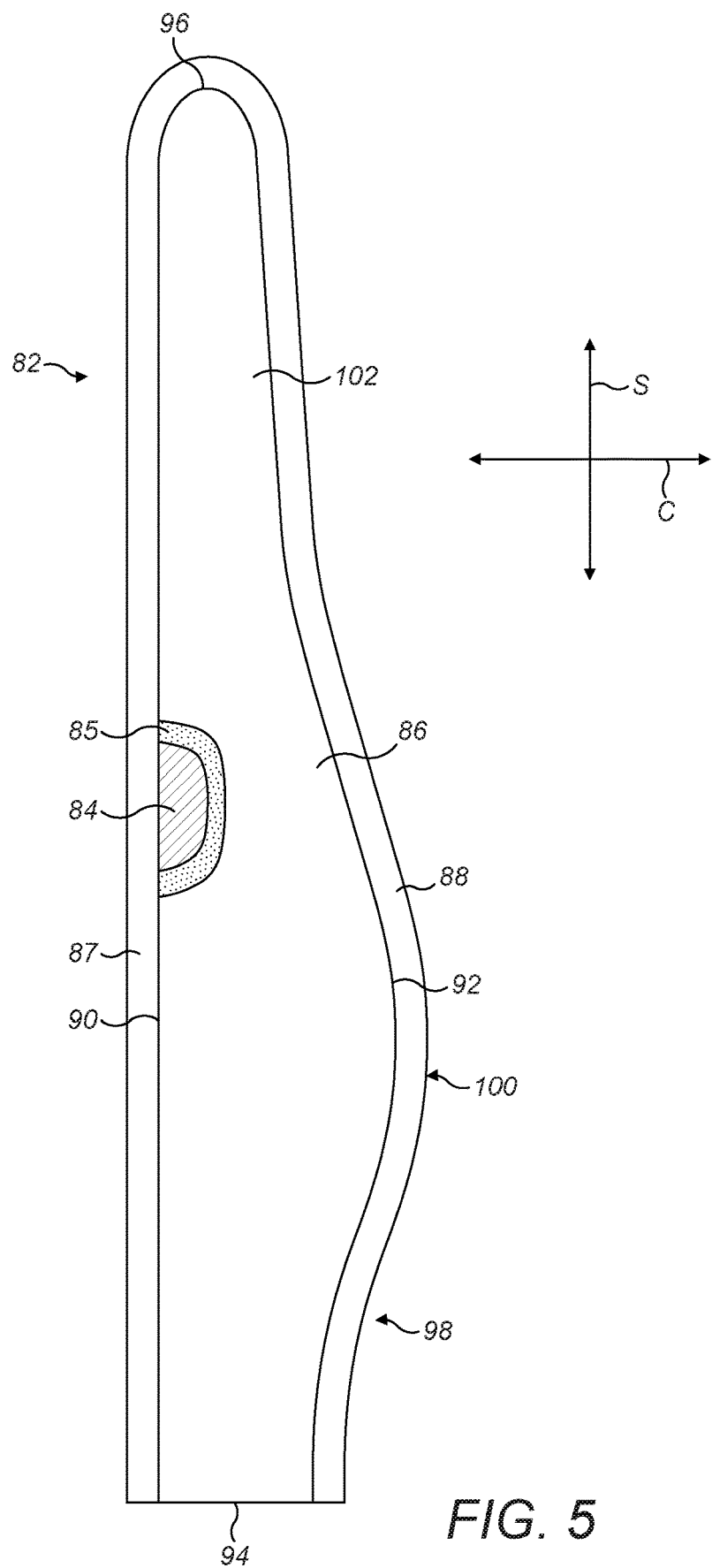
FIG. 5 is a schematic plan view of a wind turbine blade mould for forming half of an outer shell of the wind turbine blade of FIGS. 2 and 3.

Referring to FIG. 5, this shows a half mould 82 for moulding the windward half shell 44 (see FIG. 3) of the wind turbine blade 18. The half mould 82 will be referred to hereafter for convenience as the mould. The mould 82 comprises a mould surface 84 having a shape corresponding to the shape of the half shell 44 to be formed. In FIG. 5 the mould surface 84 is covered by a gel coat 85 and a layer of triax prepreg 86, as explained later, but for illustrative purposes is indicated by hatching in a partial cut-out portion of FIG. 5. The mould 82 further comprises leading- and trailing-edge flanges 87, 88 extending alongside leading and trailing edges 90, 92 of the mould surface 84 respectively.

The mould surface 84 extends in a spanwise direction S between a root end 94 and a tip end 96 and extends in a chordwise direction C between the leading edge 90 and the trailing edge 92. The mould surface 84 has a generally concave-curved shape between the leading and trailing edges 90, 92. A root end portion 98 of the mould 82 transitions from a generally semi-circular profile at the root end 94 into a half-airfoil profile at a shoulder 100 of the mould 82. An outboard portion 102 of the mould 82 between the shoulder 100 and the tip end 96 has a half-airfoil profile of progressively decreasing depth relative to the mould flanges 87, 88 moving from the shoulder 100 to the tip 96.

The shell manufacturing process begins with the application of a gel coat 85 to the mould surface 84. The gel-coat 85 is shown schematically in the partially cut-away portion of FIG. 5. Once the gel coat 85 has been applied, the outer skin 48 of the half shell 44 (shown in FIG. 3) is laid up on top of the gel coat 85. This involves firstly covering the mould surface 84 with a layer of prepreg glass-fibre triax fabric 86. As will be understood by persons skilled in the art, prepreg triax comprises groups or layers of parallel fibres typically oriented at relative angles of zero degrees, and +/−45 degrees, which are pre-impregnated with a matrix material, such as epoxy resin.

Figure 6:
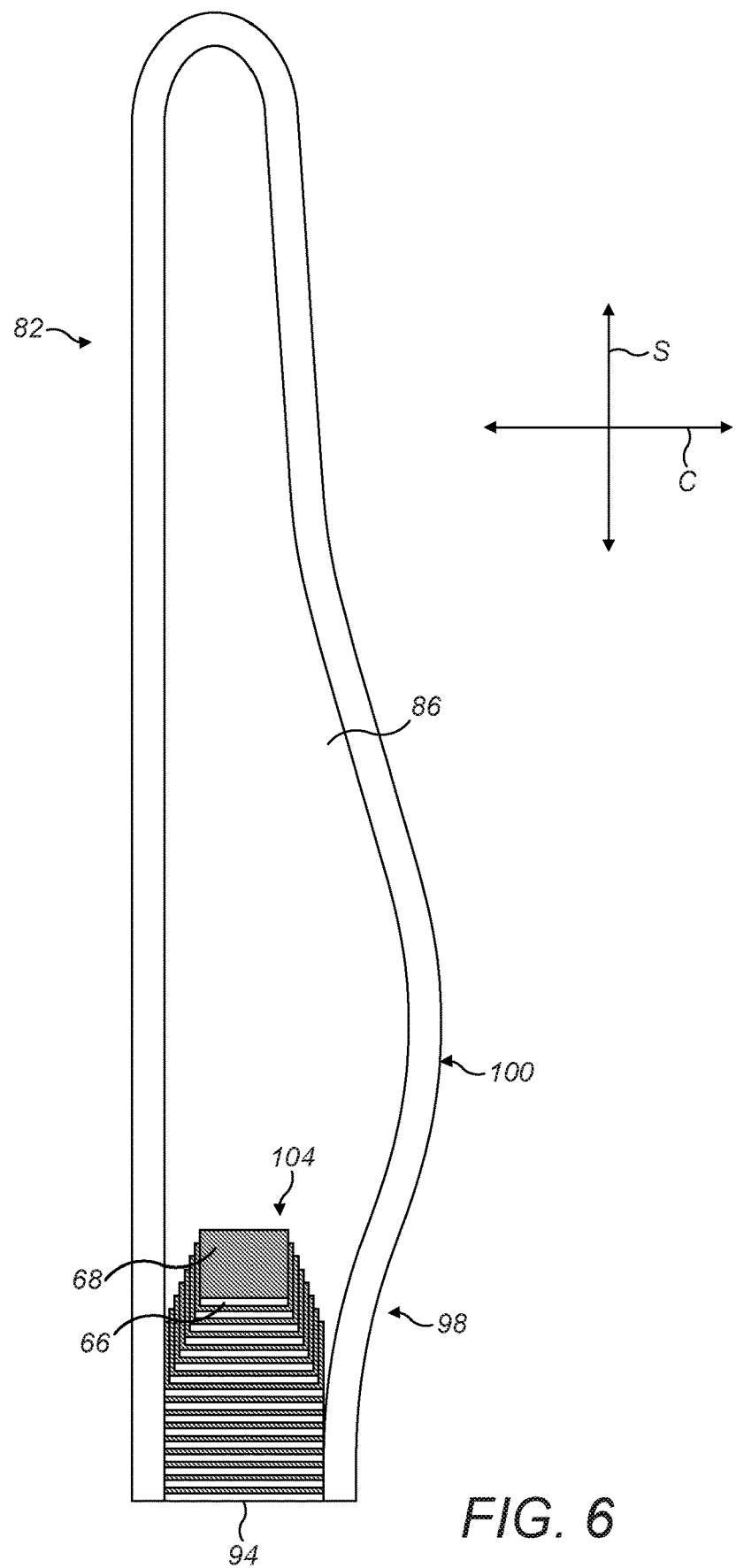
FIG. 6 shows a first hybrid shell structure arranged at a root of the blade mould to form part of an outer skin of the outer shell of the blade.

Referring to FIG. 6, the layup of the outer skin 48 (shown in FIG. 3) continues by assembling a first hybrid shell structure 104 in the root end portion 98 of the mould 82. The hybrid shell structure 104 is assembled by arranging a series of preforms similar to the preform 74 shown in FIG. 4b in the mould 82. The preforms are arranged on top of the triax prepreg layer 86, and are placed in the mould 82 sequentially, one on top of the next, in an overlapping and staggered formation.

The process of forming the hybrid structure 104 begins with arranging a series of overlapping preforms of similar chordwise width in staggered relation in a cylindrical portion of the mould 82 at the root end 94. The process continues by arranging further preforms of progressively decreasing chordwise width in overlapping and staggered relation to form a tapered end portion of the hybrid structure 104, which progressively reduces in width moving in the spanwise direction S away from the root end 94 of the mould 82.

The hybrid structure 104 therefore comprises a series of stacked and overlapping plies in which dry plies 66 are interleaved, i.e. arranged alternately, with prepreg plies 68. The hybrid structure 104 provides the blade shell with additional thickness in this region of the shell where additional strength is required. The staggered relationship between the plies 66, 68 is conceptually similar to a spread deck of cards.

In other embodiments, the hybrid structure 104 may be assembled from preforms comprising more than two plies 66, 68 or the entire hybrid structure 104 may be assembled outside the mould 82 before being lifted into the mould 82 in a single step. Alternatively, the hybrid structure 104 may be formed by arranging each ply 66, 68 in the mould 82 individually, i.e. without forming the plies 66, 68 into preforms. As a further alternative, the method may comprise any combination of these techniques.

As mentioned above, in this example the preforms are arranged in the mould 82 starting with the preform closest to the root end 94 of the mould 82. The first preform is arranged such that its dry ply 66 is positioned directly on top of the prepreg triax layer 86 forming the outermost layer of the outer shell 44 (shown in FIG. 3). The tack of the prepreg outermost layer 86 serves to maintain the preform in the correct position in the mould 82. Subsequent preforms are arranged so that the dry ply 66 of the preform overlaps the prepreg ply 68 of the previously-placed preform. The tack of the previously-placed prepreg ply 68 advantageously serves to maintain the correct position of the subsequently-placed preform in the mould 82.

Figure 7A:
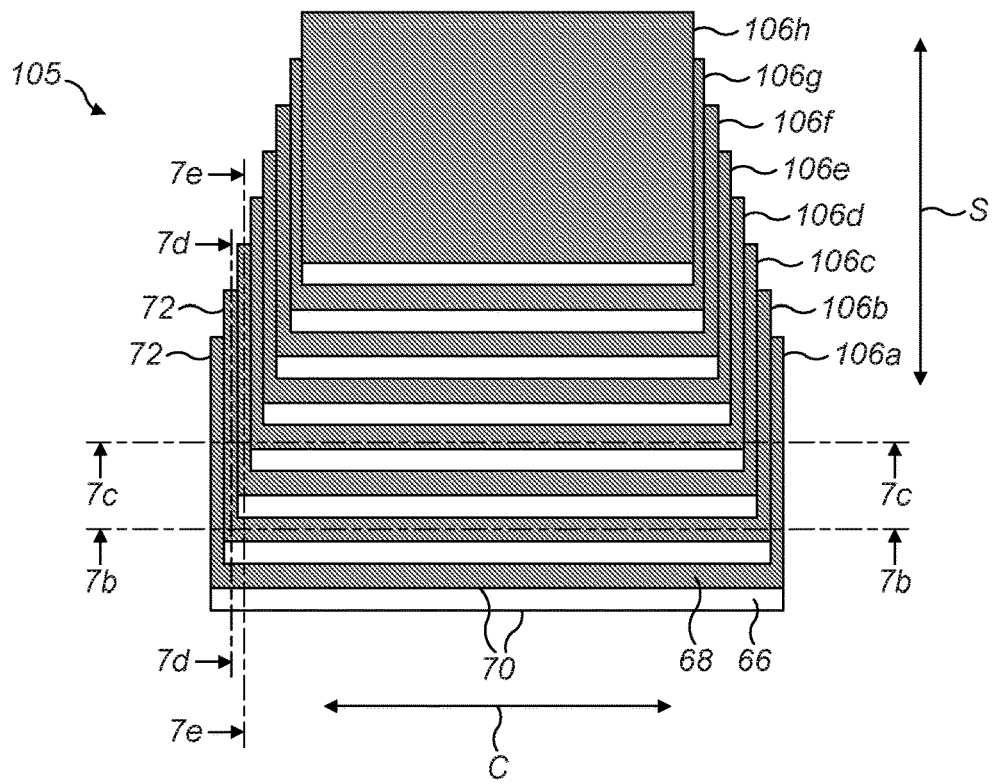
FIG. 7a is an isolated view of a stack of plies forming a hybrid structure.

Referring to FIG. 7a, this shows an exemplary hybrid shell structure 105 in isolation. The hybrid structure 105 resembles the tapering end portion of the hybrid shell structure 104 shown in FIG. 6, and the following discussion is intended to illustrate the principles of staggered layers applicable to the various hybrid structures described herein.

The hybrid structure 105 in FIG. 7a comprises a stack of interleaved dry and prepreg plies 66 and 68 and is formed from a series of preforms 106a-h in a similar manner to the hybrid structure 104 described in relation to FIG. 6. In this example, each subsequently-placed preform 106b-h has a slightly reduced width in the chordwise direction C in comparison to the previously-placed preform 106a-g. This results in the hybrid structure 105 tapering in chordwise width moving in the spanwise direction S. It also results in the preforms 106a-h being staggered in the chordwise direction C in that corresponding spanwise edges 72 of adjacent preforms 106a-h are offset from one another in the chordwise direction C.

Figure 7B:
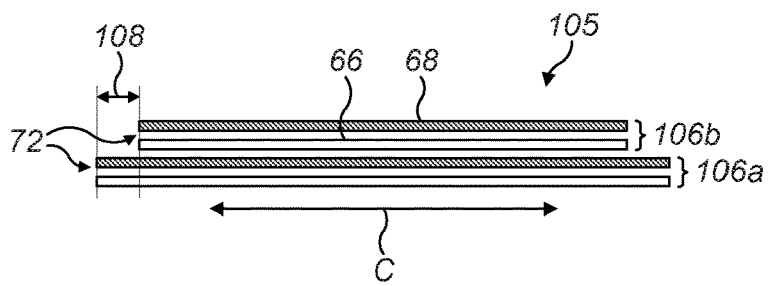

FIG. 7b is a schematic cross section through the hybrid shell structure 105 taken along the line 7b-7b in FIG. 7a. Here it can be seen that this portion of the hybrid structure 105 has a local thickness made up of two preforms 106a, 106b, hence it has four layers. The four layers comprise two dry plies 66 arranged alternately with two prepreg plies 68. The double-headed arrow 108 in FIG. 7b indicates the staggered relationship between the preforms 106a, 106b in the chordwise direction C, with corresponding spanwise edges 72 of the first and second preforms 106a, 106b being offset from one another in the chordwise direction C.

Figure 7C:
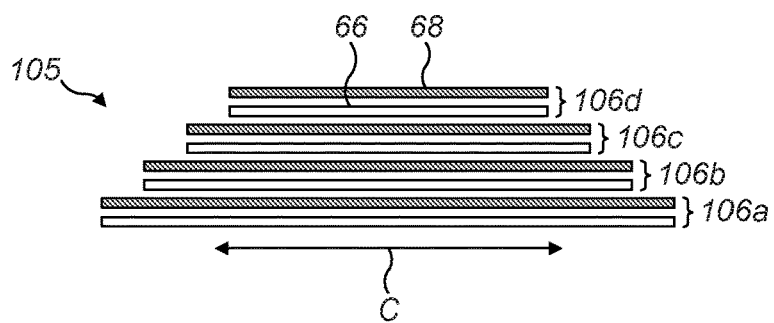

FIG. 7c is a schematic cross section through the hybrid shell structure 105 taken along the line 7c-7c in FIG. 7a. Here it can be seen that this portion of the hybrid structure 105 has a local thickness made up of four preforms 106a-d, hence it has eight layers. The eight layers comprise four dry plies 66 arranged alternately with four prepreg plies 68.

Figure 7D:
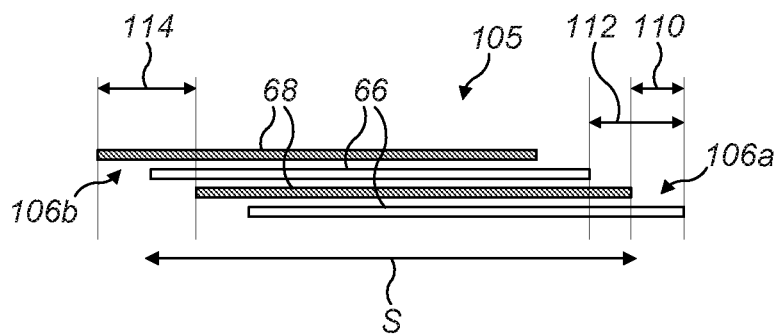

FIG. 7d is a schematic cross section through the hybrid shell structure 105 taken along the line 7d-7d in FIG. 7a. Here it can be seen that this portion of the hybrid structure 105 has a local thickness made up of two preforms 106a, 106b, hence it has four layers. This figure illustrates the staggered relationship between the plies 66, 68 in the spanwise direction S. The double-headed arrow 110 indicates the offset between corresponding chordwise edges 70 (see FIG. 7a) of the dry and prepreg plies 66, 68 of the first preform 106a in the spanwise direction S. The double-headed arrow 112 indicates the offset between corresponding chordwise edges 70 of the dry plies 66 in the spanwise direction S. The double-headed arrow 114 indicates the offset between corresponding chordwise edges 70 of the prepreg plies 68 in the spanwise direction S.

Figure 7E:
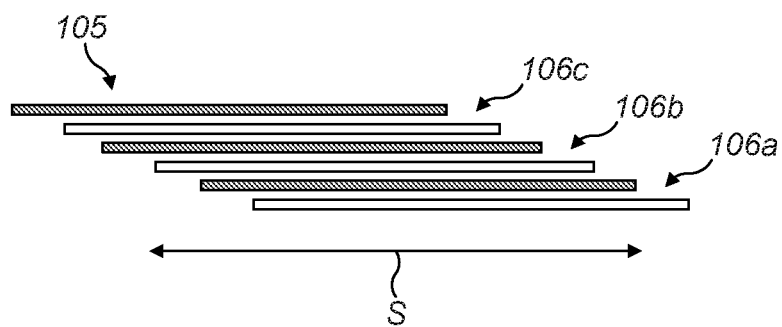

FIG. 7e is a schematic cross section through the hybrid shell structure 105 taken along the line 7e-7e in FIG. 7a. Here it can be seen that this portion of the hybrid structure 105 has a local thickness made up of three preforms 106a-c, hence it has six layers.

It will be appreciated from FIGS. 7a-7e that the staggered relationship between plies 66, 68 allows the local thickness of the hybrid structure 105, and hence the local thickness of the blade shell 44 to be controlled. The various offsets between the corresponding edges 70, 72 described above can be varied and/or selected to achieve a particular local thickness.

Figure 7F:
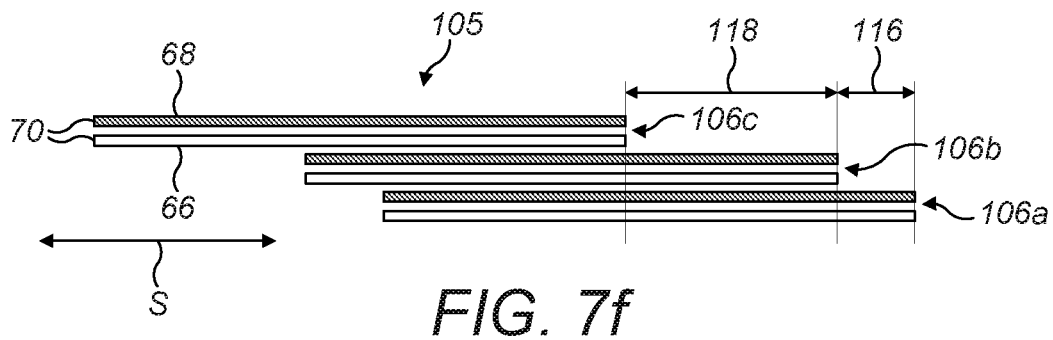
FIG. 7f shows an alternative arrangement of stacked layers in which dry plies are aligned in a spanwise direction with neighbouring prepreg plies.

FIG. 7f indicates a further example whereby the corresponding chordwise edges 70 of dry and prepreg plies 66, 68 in the preforms 106a-c are not offset but are substantially aligned. This figure shows that it is still possible to vary the local thickness of the hybrid structure with such preforms 106a-c by controlling the offset between corresponding edges of the various preforms 106a-c. In particular, in this example, the spanwise offset 116 between corresponding chordwise edges 70 of the first and second preforms 106a, 106b is less than the spanwise offset 118 between corresponding chordwise edges 70 of the second and third preforms 106b, 106c. Suitable selection of these offsets 116, 118 allows the local thickness of the hybrid structure 105 to be controlled in the spanwise direction S.

Whilst the examples in FIGS. 7b-7f above relate to preforms comprising two layers 66 and 68, it will be appreciated that these structures can equally be achieved by arranging plies 66, 68 individually in the mould 82 or by forming preforms having more than two layers. The principles discussed above in relation to FIGS. 7a-7f apply to the hybrid structure 104 shown in FIG. 6 and the further hybrid structures that will subsequently be described.

Figure 8:
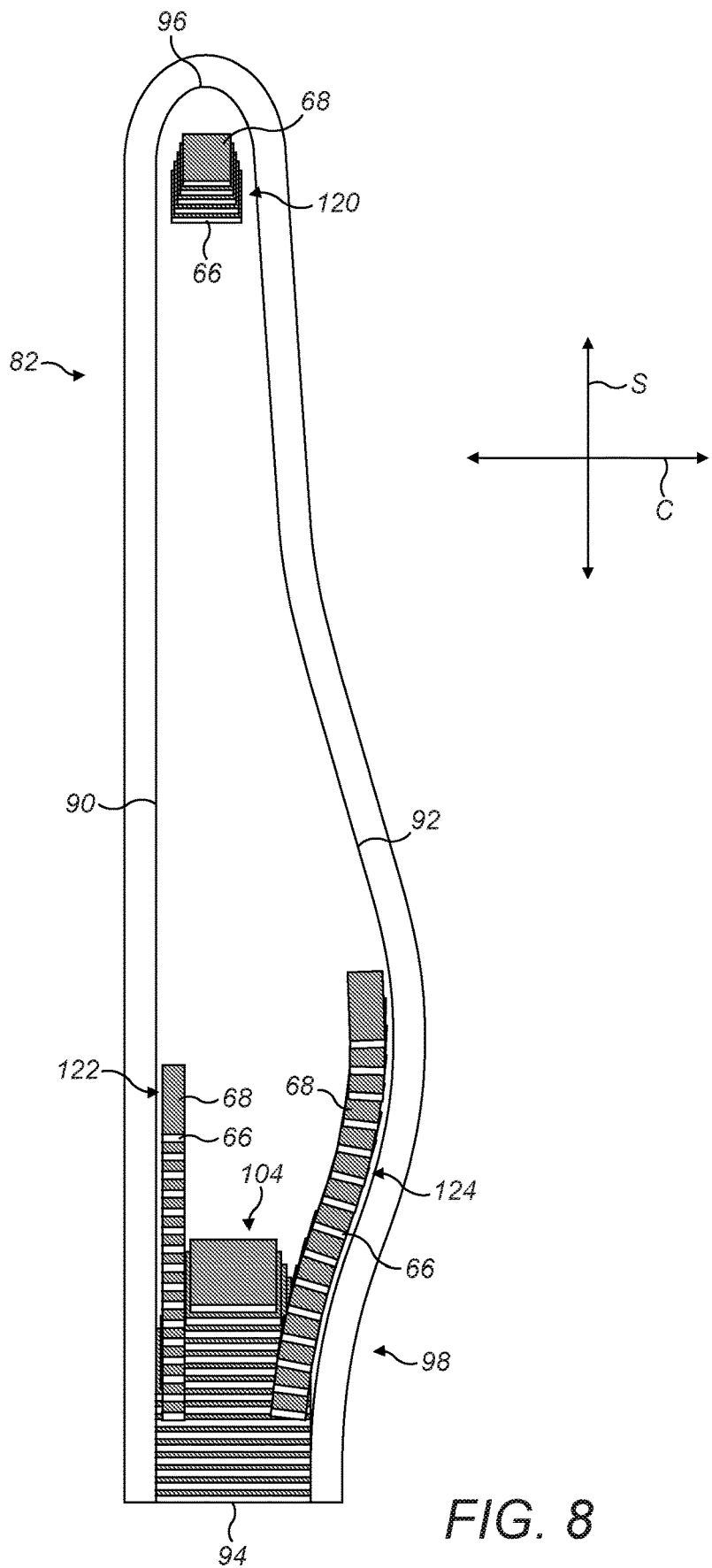
FIG. 8 shows a second hybrid shell structure arranged at a tip end of the blade mould and third and fourth hybrid structures arranged at the root end of the blade mould to form further parts of the outer skin.

Referring now to FIG. 8, the next stage in the layup process involves forming further hybrid structures of the outer skin 48 in further regions of the mould 82. Specifically a second hybrid structure 120 is provided near the tip 96 of the mould 82, and third and fourth hybrid structures 122, 124 are provided adjacent the leading and trailing edges 90, 92 of the mould 82 respectively. The third and fourth hybrid structures 122, 124 are provided in the root end portion 98 of the mould 82. These further hybrid structures 120, 122, 124 are formed in a similar manner to the first hybrid structure 104 described above. In particular, they each comprise a series of alternating layers of dry glass-fibre fabric 66 and prepreg glass-fibre fabric 68 arranged in a staggered relation.

Figure 9:
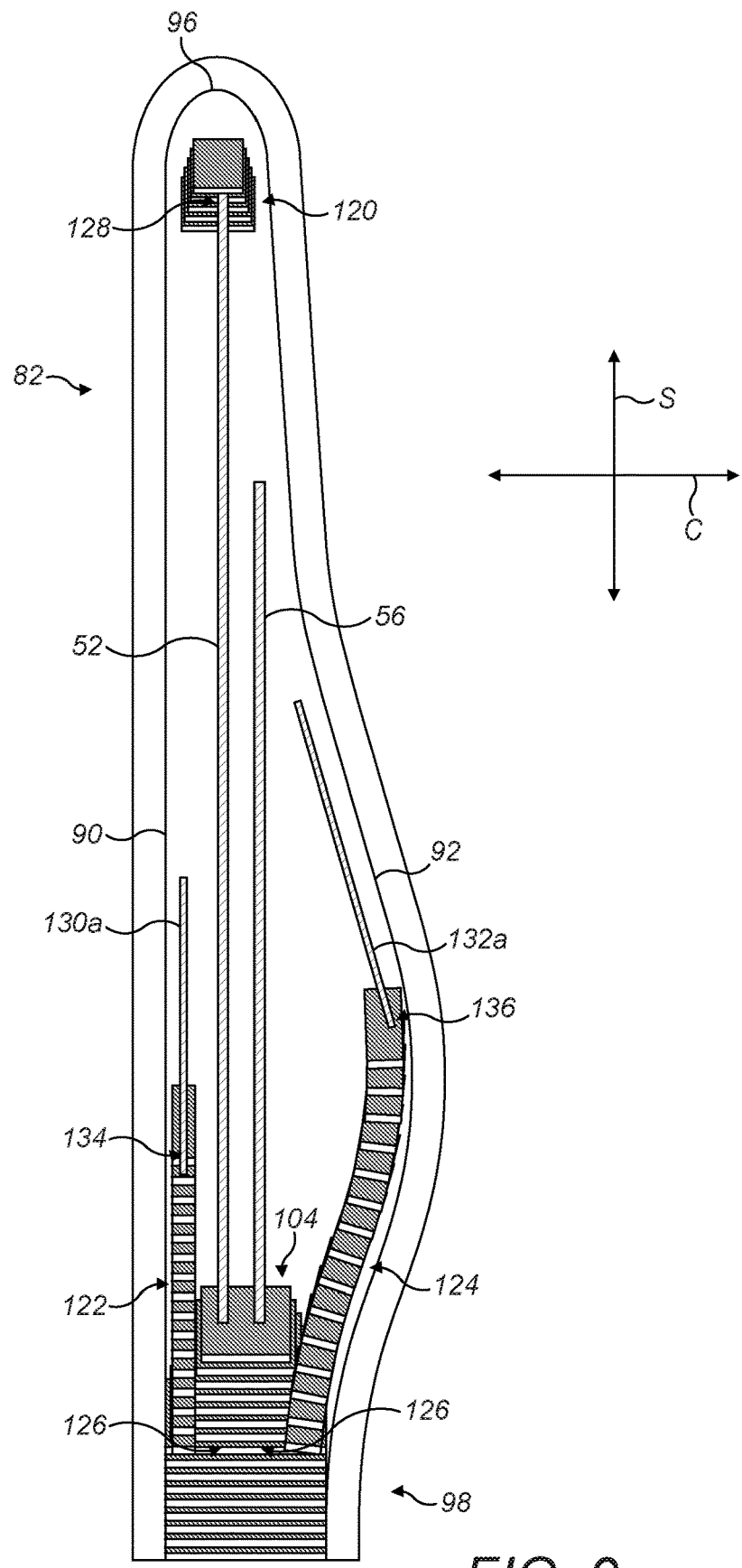
FIG. 9 shows spar caps and reinforcing strips arranged in the mould on top of the hybrid structures.

Referring to FIG. 9, the layup process continues with placement of first and second spar caps 52, 56 in the mould 82. As described previously, the spar caps 52, 56 each comprise a stack of pultruded strips of CFRP. In this example only the first spar cap 52 extends to near the tip 96 of the mould 82 but in other examples both spar caps 52 and 56 may extend to near the tip 96. The spar caps 52, 56 are arranged such that a root end 126 of each spar cap 52, 56 overlies the first hybrid structure 104 in the root end portion 98 of the mould 82, whilst a tip end 128 of the first spar cap 52 overlies the second hybrid structure 120 near the tip 96 of the mould 82.

First and second CFRP strips 130a, 132a of are then arranged adjacent portion of the leading and trailing edges 90, 92 of the mould 82 respectively. These strips 130a, 132a form part of leading- and trailing-edge stringers respectively. A root end 134 of the first strip 130a overlies part of the third hybrid structure 122 whilst a root end 136 of the second strip 132a overlies part of the fourth hybrid structure 124. The first and second strips 130a, 132a could also be formed from GRP for example.

It can be seen in FIGS. 8 and 9 that the fourth hybrid structure 124 follows a curved path adjacent the trailing edge 92 of the mould 82. The curved path is achieved by adjusting the relative angle between successive plies or preforms of the hybrid structure 124. In this example, successively arranged preforms are rotated slightly with respect to previously arranged preforms such that the fourth hybrid structure 124 follows the curvature of the trailing edge 92 in order to connect the trailing-edge stringer with the root of the blade shell. The overlapping staggered relationship between the plies advantageously allows the hybrid structure 124 to follow a curved path.

Figure 10:
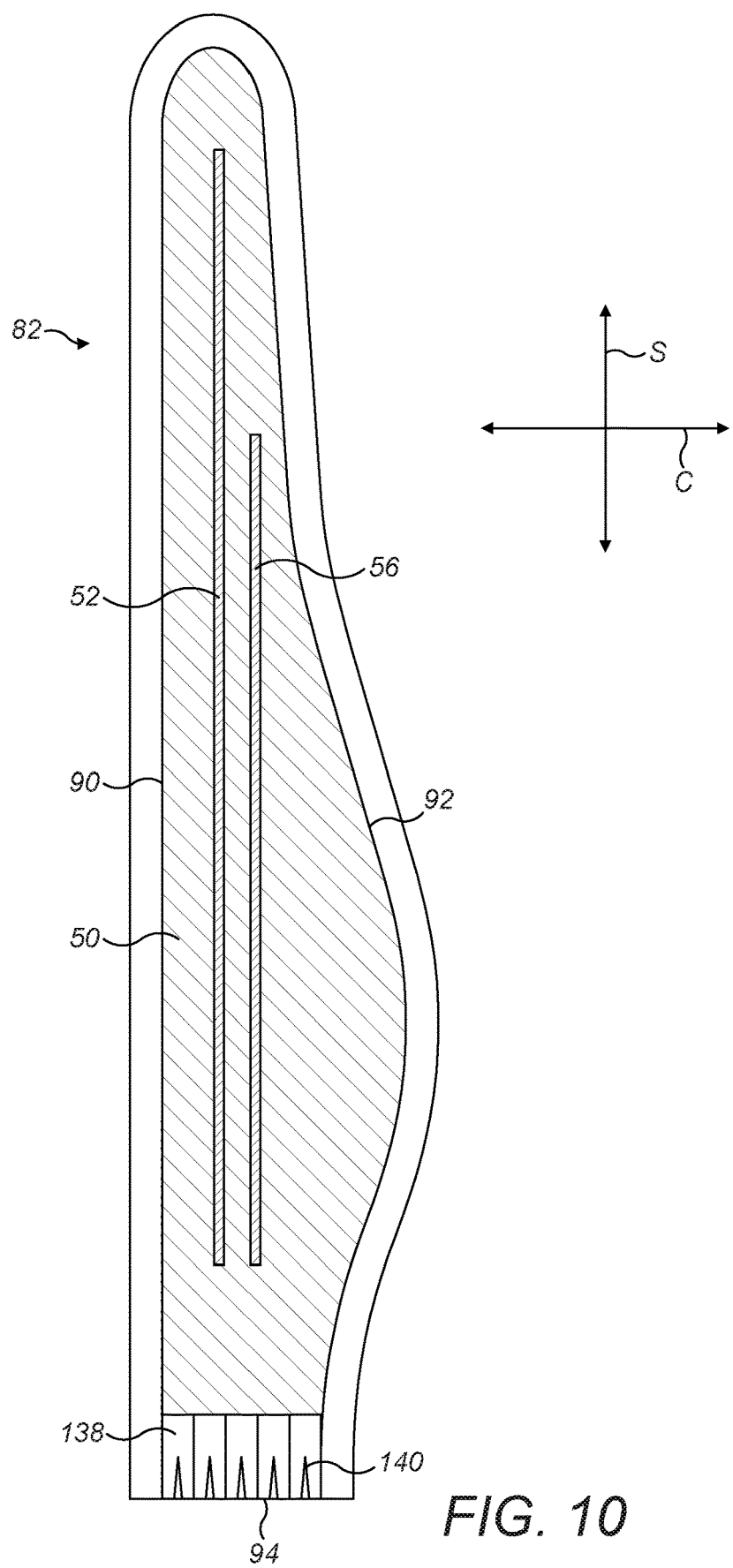
FIG. 10 shows foam panels and root inserts arranged in the mould.

Referring to FIG. 10, panels 50 of polyurethane-foam core material (or any other suitable polymer or balsa) are arranged in the mould 82. The panels 50 are arranged along the leading edge 90, between the spar caps 52, 56 and along the trailing edge 92. A plurality of root inserts 138 are then arranged at the root end 94 of the mould 82. The root inserts 138 in this example are pre-cured GRP structures provided with a hole 140 for receiving a bolt in order to connect the blade 18 to a pitch bearing. The root inserts 138 are positioned on top of the first hybrid structure 104 forming the outer skin 48 of the blade shell 44.

Figure 11:
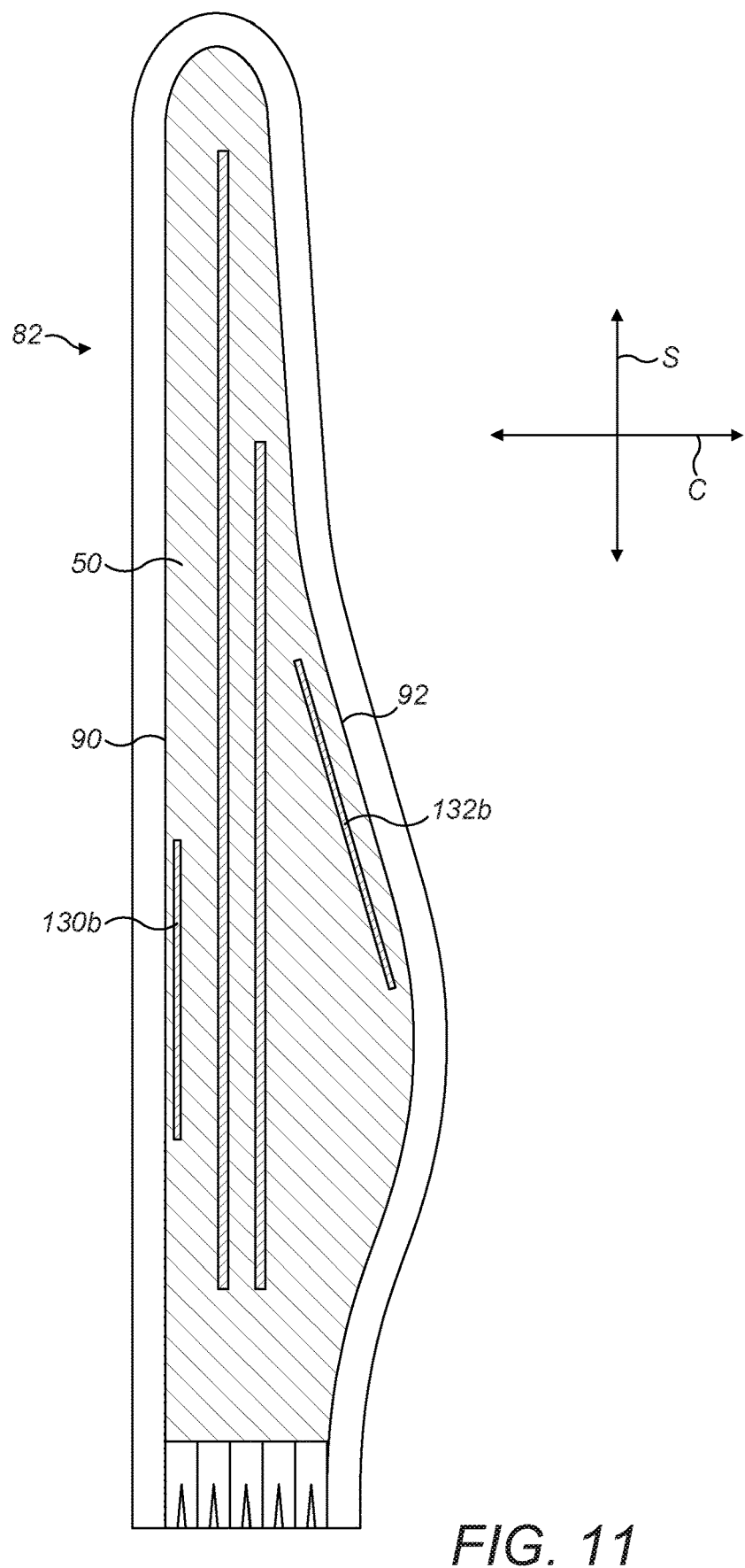
FIG. 11 shows additional reinforcing strips arranged on top of the foam panels.

Referring to FIG. 11, third and fourth CFRP strips 130b, 132b are arranged on top of the foam panels 50 at the leading and trailing edges 90, 92 of the mould 82. These strips 130b, 132b correspond to the first and second CFRP strips 130a, 132b shown in FIG. 9, and form part of the respective leading- and trailing-edge stringers. The third and fourth strips 130a, 132a could also be formed from GRP for example.

Figure 12:
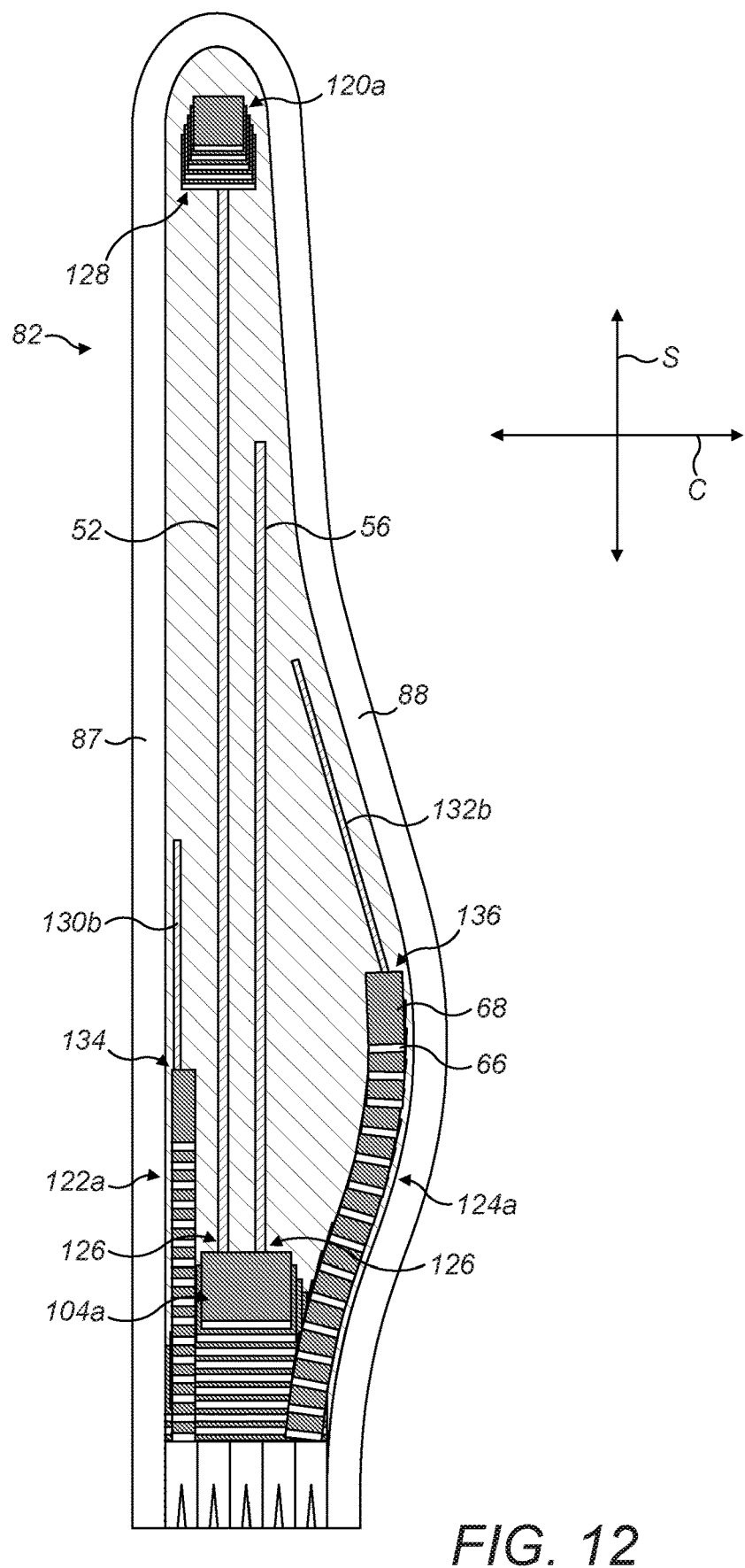
FIG. 12 shows first, second, third and fourth hybrid structures forming part of an inner skin of the blade shell arranged in the mould.

Referring to FIG. 12, the next stage in the layup process is the assembly of the inner skin 46 (shown in FIG. 3). This process corresponds substantially to the layup of the outer skin 48, although in reverse. Accordingly, first, second, third and fourth hybrid structures 104a, 120a, 122a, 124a corresponding to the first, second, third and fourth hybrid structures 104, 120, 122, 124 of the outer skin 48 are arranged in the mould 82. These hybrid structures 104a, 120a, 122a, 124a also comprise alternating layers of dry and prepreg fabric 66, 68 in staggered relation. Part of the first hybrid structure 104a of the inner skin 46 overlies the root ends 126 of the first and second spar caps 52, 56. Part of the second hybrid structure 120a of the inner skin 46 overlies the tip end 128 of the first spar cap 52. Parts of the third and fourth hybrid structures 122a, 124a of the inner skin 46 overlie the root ends 134, 136 of the respective third and fourth CFRP strips 130b, 132b of the leading- and trailing-edge stringers. Once these parts have been assembled in the mould 82, a layer of prepreg triax (not shown) is arranged over the entire assembly to complete the inner skin layup. This also completes the shell layup.

The shell layup is then covered with a vacuum film (not shown), which is sealed against the mould flanges 87, 88 to form a sealed region encapsulating the layup. Air is extracted from the sealed region and heat is applied. The applied heat initially causes the resin in the prepreg layers to mobilise and infuse throughout the various component of the layup. The prepreg layers 68 in the hybrid skin structures comprise excess resin, which infuses into the dry layers 66. Sufficient resin is therefore contained in the various prepreg materials in the mould, including the triax layers forming the innermost and outermost layers of the shell 44, to avoid the requirement for supplying resin from an external source during the manufacturing process.

Once the resin has infused throughout the various components of the layup, continuing application of heat causes the resin to cure, i.e. harden and integrate the various components of the shell 44 together. This completes the manufacturing process for the half shell 44. The vacuum film can then be removed. The leeward half shell 42 is manufactured in a substantially identical process in its respective mould half. The half shells 42, 44 are then bonded together with the shear webs 60, 62 shown in FIG. 3 positioned between the half shells 42, 44 and bonded to respective inner surfaces of the half shells 42, 44.

The various hybrid shell structures described above may also be referred to as 'stacks' as they are in the form of stacks of plies. The stacks provide additional thickness and hence additional strength to the blade shell where it is needed. The first stack 104, 104a connects the root inserts 138 with the spar caps 52, 56. The root inserts 138 and the root ends 126 of the spar caps 52, 56 are sandwiched between the first stack 104 of the inner skin 46 and the first stack 104a of the outer skin 48. In the finished outer shell 42 of the blade 18, the first stack 104, 104a therefore provides a thick and hence strong section of the outer shell 42 that is able to transfer loads effectively from the spar caps 52, 56 into the root 22 of the blade 18.

The second stack 120, 120a forms an effective extension of the tip end 128 of the spar cap 52 at the tip 24 of the blade 18 and provides additional thickness and reinforcement of the outer shell 42 of the blade 18 at the tip 24.

The third and fourth stacks 122, 122a and 124, 124a form a transition between the leading- and trailing-edge stringers and the root end 22 of the blade 18. These stacks 122, 122a and 124, 124a provide additional thickness and strength in the blade shell 42 between the stringers and the root 22 of the blade 18, and thereby provide a continuous load path through the outer shell 42 between the stringers and root 22 to ensure that loads acting on the leading and trailing edges 26, 28 of the blade 18 are transferred effectively to the root 22 of the blade 18.

The hybrid shell technology described above provides many advantages. The tack from prepreg layers ensures fast and robust positioning of dry plies in the mould, avoiding creasing and wrinkling of the dry plies and maintaining the dry plies in position without requiring layers to be stitched together.

The staggered relationship between plies/preforms results in the layup being highly compliant to complex surfaces (such as surfaces with double curvature) and can readily be formed to connect to load carrying stringers. Varying the stagger between plies or preforms allows the local thickness of the shell structure to be readily adjusted. The staggered relationship between plies/preforms allows the hybrid structures to taper in width to transition from wide areas of the shell, e.g. at the root end of the blade, to narrower areas, e.g. where the spar caps are positioned. The staggered relationship of the plies also allows relatively short plies to be used to produce thick laminate stacks. This ensures good drapeability of the plies in the mould allowing the plies to conform accurately to the contours of the mould without wrinkles.

The dry layers interleaved between the prepreg layers enhances vacuum transport through the thickness of the layers since the dry layers facilitate air extraction. This allows thick structures to be created whilst avoiding the requirement for de-bulking, which is normally required when several prepreg layers are stacked on top of one another to form a thick structure.

The prepreg layers provide sufficient resin to infuse into the dry layers therefore avoiding the need for supplying additional resin to the mould. This eliminates the requirement for resin handling and storage systems, resin mixing pumps and infusing media, which are typically required when working with dry media and resin infusion processes. It also avoids the possibility of resin mix errors etc. It further allows the cure cycle to commence immediately after vacuum bagging. The resin needs only to flow into neighbouring layers. Accordingly, any leaks that may develop in the vacuum process are less likely to compromise the shell structure The bill of materials cost is reduced in comparison to standard techniques, since fewer prepreg layers are required in comparison to standard prepreg processes, and resin handling systems are avoided in comparison to standard dry infusion processes.

The above examples are provided purely to assist in the understanding of the present invention and are not intended to be limiting or exhaustive. In other examples, hybrid structures may be formed in other regions of the mould. Various modifications to the examples described above may be made without departing from the scope of the present invention as defined in the accompanying claims.

The invention claimed is:

1. A method of making a wind turbine blade component comprising an outer shell having a laminate structure, the method comprising:
    providing a blade mould defining a shape of at least part of the outer shell of the blade, the mould extending in a spanwise direction between a root end and a tip end, and extending in a chordwise direction between a leading edge and a trailing edge;
    providing a plurality of dry plies comprising dry structural fibrous material;
    providing a plurality of prepreg plies comprising structural fibrous material impregnated with resin;
    arranging the plurality of dry plies and the plurality of prepreg plies in the mould to form a plurality of layers of the laminate structure of the outer shell of the blade, the dry plies being interleaved with the prepreg plies to form a hybrid shell structure in which the plies are arranged in a staggered relationship such that corresponding edges of the dry plies are offset from one another in the spanwise direction of the mould and/or corresponding edges of the prepreg plies are offset from one another in the spanwise direction of the mould; and
    arranging a spar cap in the mould such that a first end of the spar cap is arranged on top of or between one or more plies of the hybrid shell structure,
    wherein the first end of the spar cap is spaced from the root end of the mould, and the hybrid shell structure extends in a spanwise direction between the root end of the mould and the first end of the spar cap.

2. The method of claim 1, wherein the method comprises arranging one or more preforms in the mould to form the hybrid shell structure, wherein each preform comprises at least one dry ply of the plurality of dry plies adhered to at least one prepreg ply of the plurality of prepreg plies.

3. The method of claim 1, comprising forming the hybrid shell structure from the plurality of dry plies and the plurality of prepreg plies outside the mould and lifting the hybrid shell structure into the mould.

4. The method of claim 1, wherein the method comprises forming the hybrid shell structure in one or more discrete regions of the mould corresponding to regions of the outer shell where increased thickness is required.

5. The method of claim 1, wherein the method comprises forming the hybrid shell structure at the root end of the mould and/or at the tip end of the mould and/or adjacent the leading edge of the mould and/or adjacent the trailing edge of the mould.

6. The method of claim 1, wherein the hybrid shell structure tapers in width in the chordwise direction moving from the root end of the mould towards the first end of the spar cap.

7. The method of claim 1, further comprising providing one or more root inserts at the root end of the mould on top of or between plies of the hybrid shell structure.

8. The method of claim 1, wherein the hybrid shell structure is arranged to form part of an inner and/or an outer skin of the outer shell of the blade.

9. The method of claim 1, wherein the method comprises providing an initial layer of prepreg material in the mould prior to arranging the hybrid shell structure on top.

10. The method of claim 1, further comprising increasing the temperature of the plies to cause resin from the prepreg plies (68) to infuse into the dry plies.

11. The method of claim 1, further comprising integrating the materials comprising the outer shell of the blade together by means of the resin contained in the prepreg materials and without supplying additional resin from an external source.

12. A method of making a wind turbine blade component comprising an outer shell having a laminate structure, the method comprising:
   providing a blade mould defining a shape of at least part of the outer shell of the blade, the mould extending in a spanwise direction between a root end and a tip end, and extending in a chordwise direction between a leading edge and a trailing edge;
   providing a plurality of dry plies comprising dry structural fibrous material;
   providing a plurality of prepreg plies comprising structural fibrous material impregnated with resin; and
   arranging the plurality of dry plies and the plurality of prepreg plies in the mould to form a plurality of layers of the laminate structure of the outer shell of the blade,
   wherein the plies are arranged in the mould such that the dry plies are interleaved with the prepreg plies to form a hybrid shell structure in which the plies are arranged in a staggered relationship such that corresponding edges of the dry plies are offset from one another in the spanwise and chordwise direction of the mould and/or corresponding edges of the prepreg plies are offset from one another in the spanwise and chordwise direction of the mould.

* * * * *